Oct. 2, 1923.
K. STAHL
1,469,280
TENSILE STRESS DETERMINING DEVICE
Filed June 28, 1920
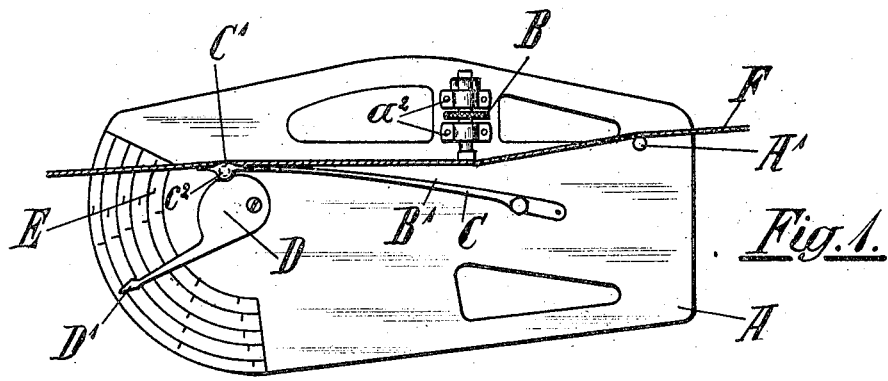
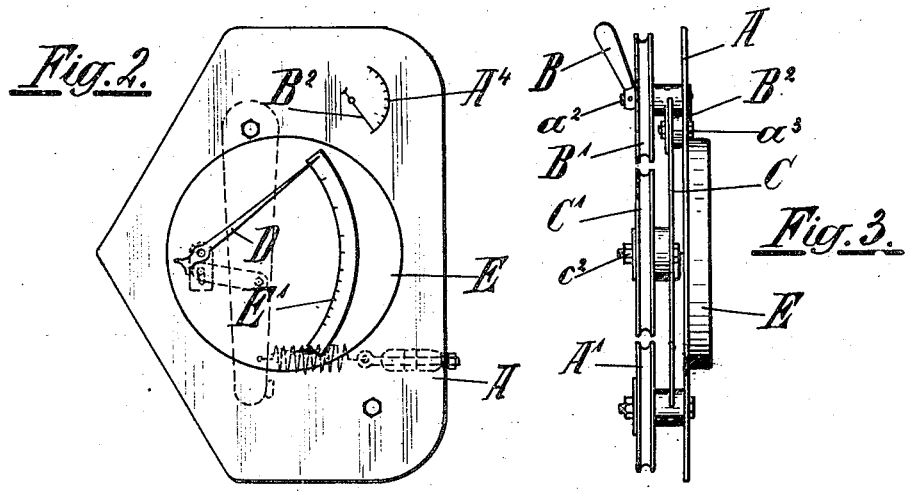
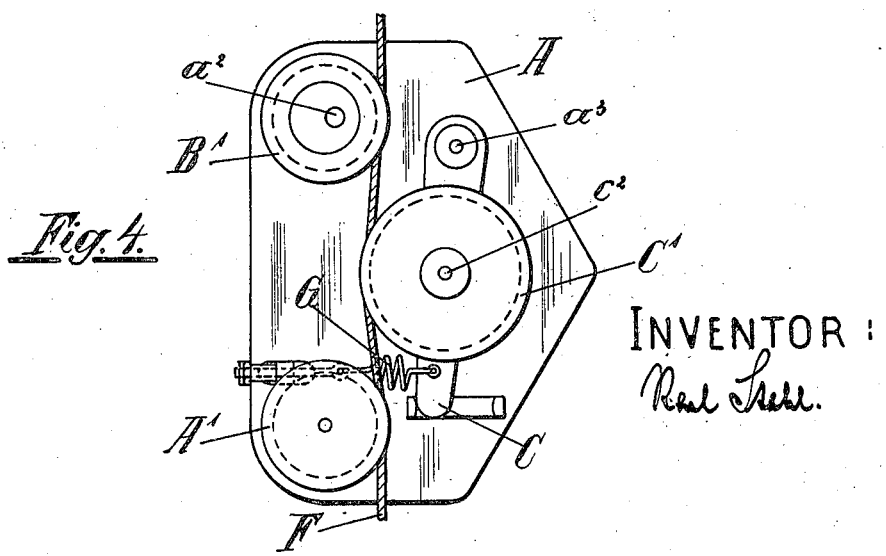
INVENTOR:
Karl Stahl.

Patented Oct. 2, 1923.

1,469,280

UNITED STATES PATENT OFFICE.

KARL STAHL, OF FRIEDRICHSHAFEN, GERMANY, ASSIGNOR TO LUFTSCHIFFBAU ZEPPELIN GESELLSCHAFT MIT BESCHRÄNTER HAFTUNG, OF FRIEDRICHSHAFEN, GERMANY.

TENSILE-STRESS DETERMINING DEVICE.

Application filed June 29, 1920. Serial No. 392,603.

*To all whom it may concern:*

Be it known that I, KARL STAHL, a citizen of the German Empire, residing at Friedrichshafen, Germany, have invented certain new and useful Improvements in Tensile-Stress-Determining Devices, of which the following is a specification.

My invention relates to devices for determining the tensile stress of wires, ropes, belts, and the like, in the case of which more or less flexibly stretched tension members are deflected from their rectilinear course by being forcibly caused to bear up against three guide members. My invention refers more particularly to measuring devices of the kind in which two guide members are disposed at an unalterable distance from each other, whereas the third relatively to the two others, is resiliently arranged to oscillate in the manner of a lever.

The special object of my invention is to so construct and arrange these said devices which, as compared with other devices of the kind known, will prove to be far more simple and far less sensitive in service, that they will enable the measuring operation to be carried out quickly and accurately, affording, in particular, the possibility of directly reading off the tension required, without requiring, when testing different kinds of tensile bodies, the setting of extremely sensitive adjusting devices, an operation not only entailing a great loss of time but which also embodies a great deal of unreliability.

The subject matter of this invention consequently forms a tension measuring device, in particular for wires and ropes, of the kind above indicated, in the case of which one of the non-flexible guide members is provided with a device by the displacement of which both the connection and disconnection of the member or body to be tested is facilitated, as also the testing of variously stout bodies rendered possible without requiring any changing of the measuring instrument itself. In accordance with the invention, the resilient guide member is caused by means of a gearing, serving to increase the extent of the deflections, to affect or act upon an index, which is adapted to directly denote the tension required in connection with tensile bodies of varying thickness and strength, without the necessity arising of either renewing or but setting the spring keeping the guide member in tension. The ratio of the transmission required will preferably be so selected as to admit of alteration, in order to secure possibly uniformly good and exact results when reading off the tension in respect of powerfully stretched tensile bodies.

A considerable advantage incorporated in the subject matter of the invention resides in the fact that although it admits of broadest application; it yet embodies but a small number of movable parts, and notably but a small number of indicating and setting devices, as also that the moveable parts are so lodged that their displacement will affect neither the reliability of service, nor the accuracy of the measurements taken, nor the easy manipulation of the apparatus, so that this latter as an entirety may be directly calibrated for different rope diameters and loads.

To embodiments of the subject matter of this invention are shown, diagrammatically, by way of example on the accompanying drawing, in which:

Fig. 1 is a view of a rope-tension measuring device especially suitable for thin wires, Figs. 2 to 4, a front, side, and rear view, respectively, of a similar device suitable for stouter wires and ropes.

In the construction according to Fig. 1, a base plate A is adapted to support a bolt-shaped guide member A'. A second guide member B' may be secured by means of a small regulating or adjusting ring B and a lock nut within two supports $a^2$ arranged at the base plate A.

A plate spring C is attached with one of its ends opposite to the base plate A, while its unattached end is adapted to support at the side thereof facing the guide members A' and B' a stop C', and on the opposite side a roller $c^2$. A torsional spring, not shown in the drawing, causes a rotatable cam D, terminating in an index D' to bear up against this said roller. The index D' moves across a series of concentrically arranged scales E, each of which is intended to correspond to a particular diameter of wire. The shape of the cam is such that the same alterations of the tension sought for will at least approximately correspond to the like differences of the scale divisions. In order to compensate for any petty inaccuracies caused during manufacture, the guide member B' is suitably adjusted when calibrating. However, it might just as well be used to be displaced along one scale only in accordance with the different rope diameters to be measured. In Fig. 1 it is assumed that a tensile force P of 50 kg. is brought to bear upon the ends of a wire F, 2½ mm. in diameter, placed in tension. In accordance herewith the index D' is shown as pointing to the numeral 50 of the central row of scales.

In the second form of execution according to Figs. 2–4, a base plate A is adapted to support on its rear face a disc-shaped guide member A' as also two axes $a^2$ and $a^3$. By means of a handle B, a guide disc B' is adapted to be eccentrically displaced about the member $a^2$. The said displacement is indicated by an index $B^2$, moving across a scale $A^4$ arranged on the front face of plate A and indicating the rope diameter. A lever C is adapted to oscillate about an axis $a^3$, to the unattached end of which lever there is connected a tension spring G adjustably connected to the base plate A. A spindle $c^2$ provided at the lever C is arranged to support a guide disc C'. The deflections of this latter are transmitted in the form of an increased transmission on the axis of an index D, disposed to move across a scale E' within a casing E arranged at the front face of the base plate. The three guide discs A', B', C' are disposed in one and the same plane. In the event of the device being intended to serve only for determining the rope tension of wire, ropes, and so on, in tension, but otherwise in a state of rest, then the guide discs may be fixed to their axes. If, on the other hand, the tension of running hauling ropes is to be ascertained, then the discs must be disposed to rotate as easily as possible.

The scale E' may, even as in the construction according to Fig. 1, be adapted to indicate the loads P of the tension body F, placed in tension for the time being, which have been directly ascertained by calibration. It will however be found to be expedient to merely divide it into degrees. For in that event, the eccentricity of disc B' for wires of different grades and accordingly varying breaking strength, having been suitably chosen, the periphery of the scale division may be more uniformly utilized.

If the eccentricity were only so chosen that for different grades of rope, the angular deflections of the lever C would come to correspond to the like rope tensions P, then it is true, a sufficient, say, a threefold factor of safety being provided, the scale might be fully utilized. However, in the case of a medium (?) rope grades and the like threefold factor of safety, the admissible utilizing capacity would only amount to the fourth part of the periphery of the scale, and already at three-fourths of said scale periphery the weaker rope would be broken. In accordance with this invention, the eccentricity is so chosen that the triangle, the angles of which are determined by the points of contact between rope and the three discs A', B', C', will, in spite of the load being equal, turn out to be considerably less obtuse in the case of small rope diameters than in that of big rope diameters. The arrangement may be such, that for the various rope grades, the extremity of the scale will in each case at least approximately coincide with the admissible maximum load for the particular rope grade in question.

In the form of execution under notice the eccentric shift is intended to serve the additional purpose to render it possible to readily apply the device to powerfully stretched tensile bodies by means of an appropriate though merely temporary displacement of the guide disc B'.

In as far as a subsequent accurate setting of the device to the diameter of stouter grades of rope may appear difficult, the said setting may already be effected in advance. All that is required in such a case is that one of the axes $a^2$ or $a^3$ of the guide disc B', respectively, of the lever C be adjustably arranged for the purpose of enabling the device to be more easily connected and disconnected, said adjustment being preferably again effected by means of an eccentric guide or the like. Such an arrangement will recommend itself especially in cases where running ropes, say, such belonging to hauling devices, are to be dealt with. In such a case moreover the entire tension measuring device will be provided with a spring suspension means for the purpose of being better able to make due allowance for the irregularities of the rope guide provided the guide members are of suitable height, there is no objection whatever to employing the subject matter of my invention for ascertaining giant tensions.

I claim:

1. In a device of the kind described in combination, three guide members not disposed in one straight line, one of said members being adapted to move resiliently relatively to the other members and means for adjusting one of said other members to different wire or rope diameters.

2. In a device of the kind described in combination, three guide members not disposed in one straight line, one of said members being adapted to move resiliently relatively to the other members, means for adjusting one of said other members to different wire or rope diameters, a pointer and a step-up gearing between said movable member and said pointer.

3. In a device of the kind described in combination, three guide members not disposed in one straight line, one of said members being adapted to move resiliently relatively to the other members, means for adjusting one of said other members to different wire or rope diameters, a pointer and an adjustable step-up gearing between said movable member and said pointer.

4. In a device of the kind described in combination, three guide members not disposed in a straight line, two of said members being fixed, the free end of a leaf spring forming the third member, a pointer and a step-up gearing between said spring and said pointer.

5. In a device of the kind described in combination, three rotary guide members not disposed in one straight line, one of said members being adapted to move resiliently relatively to the other members and means for adjusting one of said other members to different wire or rope diameters.

In testimony whereof I affix my signature.

KARL STAHL.